United States Patent

Uemae et al.

[11] Patent Number: 5,898,043
[45] Date of Patent: Apr. 27, 1999

[54] POWDER COATING COMPOSITION

[75] Inventors: Masami Uemae; Noriyuki Tonami, both of Uozu; Yukinori Nakazato, Sano; Hiroshi Serizawa, Kazo, all of Japan

[73] Assignee: Nippon Carbide Kogyo Kabushiki Kaisha, Tokyo, Japan

[21] Appl. No.: 08/860,440

[22] PCT Filed: Sep. 14, 1995

[86] PCT No.: PCT/JP95/01831

§ 371 Date: Jun. 26, 1997

§ 102(e) Date: Jun. 26, 1997

[87] PCT Pub. No.: WO96/20251

PCT Pub. Date: Jul. 4, 1996

[30] Foreign Application Priority Data

Dec. 26, 1994 [JP] Japan ..................................... 6-336614
Dec. 27, 1994 [JP] Japan ..................................... 6-336928
Dec. 29, 1994 [JP] Japan ..................................... 6-338365

[51] Int. Cl.$^6$ ..................................................... C08F 8/42
[52] U.S. Cl. .......................... 523/204; 428/407; 523/206; 523/207; 523/220; 525/326.6; 525/327.3; 525/328.5; 525/329.1; 525/329.2; 525/329.4; 525/329.7; 525/329.8; 525/329.9; 525/330.1; 525/330.3; 525/330.4; 525/330.5; 525/330.6

[58] Field of Search ........................ 428/407; 525/327.3, 525/326.6, 328.5, 329.1, 329.2, 329.4, 329.7, 329.8, 329.9, 330.1, 330.3, 330.4, 330.5, 330.6; 523/204, 206, 207, 220

[56] References Cited

U.S. PATENT DOCUMENTS 5,319,001  6/1994  Morgan et al. ........................ 428/407

*Primary Examiner*—Bernard Lipman
*Attorney, Agent, or Firm*—Sherman and Shalloway

[57] ABSTRACT

The present invention provides a powder coating composition comprising a resin powder comprising a film-forming resin and a crosslinking agent capable of giving rise to a crosslinking reaction with the resin, wherein the resin powder has a volume-average particle diameter of 3–17 $\mu$m and a shape factor (SF) of 100.5–160. This powder coating composition can form a coating film having luster and smoothness and can be applied in a thin film.

21 Claims, No Drawings

POWDER COATING COMPOSITION

TECHNICAL FIELD

The present invention relates to a powder coating composition which is capable of forming a coating film superior in gloss, definition property, weatherability and other film properties and which is useful for coating of vehicles, ships, household electric appliances, coated steel plates, etc.; as well as to a process for production of the powder coating composition.

BACKGROUND ART

Organic solvent type coatings, which are obtained by dissolving main components such as resin and the like in an organic solvent and adding thereto auxiliary components such as coloring agent, curing agent and the like, have heretofore been used widely in coating applications. As there were seriously taken up recently the problems of these organic solvent type coatings, such as fire hazard, adverse effect on safety and hydigene, environmental pollution and the like, attention is being paid to coatings which vaporize no organic solvent, particularly aqueous emulsion type coatings and powder coatings.

Aqueous emulsion type coatings, however, have drawbacks. For example, since, in producing such a coating, resin particles and a pigment must be dispersed stably in an aqueous medium and therefore a hydrophilic substance such as emulsifier or the like is used, the film formed with the coating is inevitably inferior in properties such as water resistance, alkali resistance and the like; moreover, the film has low adhesivity to a material to be coated; further, it takes a time to obtain a dried film, as compared with the case of an organic solvent type coating and, in order to complete film drying in a short time, special equipment and a high cost are required.

Meanwhile, powder coatings, which contain no organic solvent, have various excellent advantages. For example, they are free from fire hazard, adverse effect on safety and hygiene, environmental pollution, or the like; they can be stored in an ordinary storehouse; the air amount of ventilation in spray booth can be minimum and the ventiallation air can be recirculated, resulting in high energy efficiency; and the coating film obtained has no foams which are generated by the vaporization of solvent during film drying. Powder coatings have further advantages. For example, they can be used as. they are without the necessity of adjusting the viscosity, solid content, etc.; and they can be easily recovered without staining the operation site and producing any waste. Furthermore, powder coatings can be applied by automated coating and, in view of the total cost including cost of coating materials, pretreatment cost, cost of coating operation, equipment cost, etc., are very economical as compared with organic solvent type coatings and aqueous emulsion type coatings.

In spite of the above-mentioned various advantages, powder coatings are not used popularly. One reason therefor is that when a conventional powder coating is applied and baked, it is difficult to obtain a coating film having luster and smoothness and, when applied in a thin film, the film cannot hide the substrate thereof sufficiently. In applying an organic solvent type coating or an aqueous coating on a material to be coated, the resulting film can flow during the vaporization of solvent and a smooth and continuous film can be obtained easily; meanwhile, in applying a powder coating, it is difficult to obtain a film having luster and smoothness because the powder (which is a solid) causes fusion bonding and thereby a film is formed. In order to obtain a film having luster and smoothness with a powder coating, it was proposed to make smaller the particle diameters of powder coating. However, this approach is not practical because the smaller particle diameters of powder coating result in lower fluidity of particles (i.e. powder coating) and inferior coatability.

In addition, powder coatings essentially have a serious drawback. Generally, coatings are required to not only have a role of protecting a material to be coated, from outside circumstances but also give a fine appearance on the material to be coated and, therefore, are required to be prepared as a series of many coatings each having a different color. Meanwhile, powder coatings are not suitable for production of many coatings of different colors, owing to the particular production process.

Production of a powder coating is ordinarily conducted by appropriately blending a resin, a curing agent, a fluidity-controlling agent, a coloring agent, a charge control agent, etc., subjecting the resulting blend to heating, melting and kneading by the use of an extruder or the like, and subjecting the kneaded product to cooling, grinding and classification; thus, many steps are required. In order to obtain various powder coatings of different colors, these many steps must be conducted for each of the coatings of different colors. Therefore, in producing many powder coatings of different colors, a large number of steps and a big expense are required, and, moreover, control of various raw materials and control of steps are very complicated.

In powder coatings, when a powder coating of certain color is produced and then a powder coating of different color is produced using the same apparatuses, the latter coating is contaminated with the former coating unless all the apparatuses used in production of the former coating are cleaned sufficiently. Therefore, when sufficient cleaning is difficult, another series of production apparatuses are required for production of the latter coating and, when a number of coatings of different colors are produced, a number of series of production apparatuses are required. This is very disadvantageous as compared with when other types of coatings are produced.

The color of the film formed with a powder coating obtained as above is determined by the kind and amount of coloring agent used in the first production step, the conditions of each step, etc. However, the exact color of such a film can be confirmed only by trial application of a powder coating produced. This requires a number of steps and much time for color matching.

As one method for overcoming the above-mentioned drawbacks of powder coating, it was proposed to mix at least two colored powders each having a different fundamental color and having the maximum particle size of 10 $\mu$m or smaller and applying the resulting powder coating to form a film having a desired color (National Publication of International Patent Application No. 504431/1992=WO 60/06345). Meanwhile, a powder coating having particle sizes of smaller than 15 $\mu$m is not easily fluidized with, in particular, a commercial electrostatic coating machine. Such a powder which cannot be applied with a commercial electrostatic coating machine, cannot be called a powder coating and is merely a raw material for powder coating. In fact, in the above proposal, a mixture of at least two powder coatings each having a different fundamental color is subjected to particle agglomeration and then is applied as particles of 15–75 $\mu$m. In the above proposal, not only an extra step of particle agglomeration is needed, but also cleaning of the agglomeration apparatus is necessary and the above-mentioned problem is still not solved. The above proposal further has a serious drawback in that agglomeration of particles incurs reduction in surface smoothness of applied powder coating layer as well as in thermal conductivity of the layer and, as a result, the coating film after baking is low in smoothness and luster.

The main object of the present invention is to provide a novel powder coating which is free from the above-mentioned problems of conventional powder coatings.

One object of the present invention is to provide a powder coating capable of forming a coating film having smoothness and luster.

Another object of the present invention is to provide a powder coating capable of forming a coating film which is uniform and has a hiding power even when formed in a small thickness.

Still another object of the present invention is to provide a powder coating which can be produced at a high efficiency and is economical.

Still another object of the present invention is to provide a powder coating which makes easy the color matching of different colors and has good coatability.

Other objects of the present invention will become apparent from the following description.

DISCLOSURE OF THE INVENTION

The present invention provides a powder coating composition comprising a resin powder comprising a film-forming resin and a crosslinking agent capable fo giving rise to a crosslinking reaction with the resin, wherein the resin powder has a volume-average particle diameter of 3–17 µm and a shape factor (SF) of 100.5–160.

The powder coating composition of the present invention has a big feature in that the resin powder constituting the powder coating is very fine and uniform and has a very narrow particle diameter distribution and each particle has a smooth contour close to a sphere.

The powder coating composition of the present invention is hereinafter described in more detail.

The resin powder constituting the powder coating composition of the present invention has a structural feature that each powder particle has a smooth contour close to a sphere. This structural feature can be numerically specified by a parameter called a shape factor (SF). Here, "shape factor (SF)" is a function of two variables, i.e. the peripheral length and surface area of powder particle, and can be calculated from the following formula after processing the enlarged two-dimensional image of powder particle by the use of an image processor or the like to determine the peripheral length (PM) and area of the enlarged two-dimensional image.

$$SF=[(PM)^2 \div (4A\pi)] \times 100$$

This shape factor SF is a yardstick of smoothness (degree of unevenness) of particle contour. As the shape of particle is closer to a sphere (a circular contour), the shape factor is closer to 100; as the contour is more complex (more uneven), the shape factor is larger. The SF of the resin powder of the present invention is an average of 100 powder particles selected randomly.

The resin powder of the present invention can have a SF of generally 100.5–160, preferably 102.0–150, more preferably 105.0–140, further preferably 110–140.

The resin powder of the present invention is also has a feature that since each particle has a shape close to a sphere of smooth surface, the powder can flow freely in spite of the fine particle size and can be handled by the use of a commercial electrostatic coating machine. The resin powder of the present invention can have a volume-average particle diameter of generally 3–17 µm, preferably 3–12 µm, more preferably 5–10 µm, whereby the powder can form a coating film having luster and smoothness by powder coating.

The resin powder of the present invention further has a feature that it has a uniform particle size and accordingly a narrow particle diameter distribution. That is, the present resin powder can have a particle diameter distribution specified by the ratio $\overline{Dv}/\overline{Dn}$ of the volume-average particle diameter ($\overline{Dv}$) and the number-average particle diameter ($\overline{Dn}$), of 1–4, preferably 1–3, more preferably 1–2, further preferably 1–1.5.

Also, the present resin powder desirably has a large index ratio of generally 2 or less, particularly 1.8 or less, more particularly 1.6 or less. Here, "large index ratio" is a value obtained by measuring the distribution of particle diameters and weights of powder particles by the use of a Coulter counter and dividing a 25% diameter (that is, a particle diameter at which a value obtained by integrating the weight of each particle from the direction of the largest diameter particle becomes 25%) with a 75% diameter (that is, a particle diameter at which a value obtained by integrating the weight of each particle from the direction of the largest diameter particle becomes 75%). The large index ratio is an indicator showing the distribution of mainly a coarse particles side in the particle diameter distribution of powder particles, and a smaller large index ratio indicates a narrower particle diameter distribution.

Further, the resin powder of the present invention can have a small index ratio of preferably 2.5 or less, more preferably 2.2 or less, further preferably 2 or less. Here, "small index ratio" is a value obtained by measuring the distribution of particle diameters and numbers of powder particles by the use of a Coulter counter and dividing a 25% diameter (that is, a particle diameter at which a value obtained by integrating the number of each particle from the direction of the largest diameter particle becomes 25%) with a 75% diameter (that is, a particle diameter at which a value obtained by integrating the number of each particle from the direction of the largest diameter particle becomes 75%). The small index ratio is an indicator showing the distribution of mainly a fine particles side in the particle diameter distribution of powder particles, and a smaller small index ratio indicates a narrower particle diameter distribution.

In the above, it was described that the resin powder of the present invention has a feature of being uniform in particle size and narrow in particle diameter distribution. This feature can be specified by the percent of number of particles having particle diameters of 4 µm or smaller and the percent of weight of particles having particle diameters of 30 µm or larger.

That is, the resin powder of the present invention desirably has a number percent of fine particles having particle diameters of 4 µm or smaller as measured by a Coulter counter, of generally 40% or less, particularly 30% or less, more particularly 20% or less; and a weight percent of coarse particles having particle diameters of 30 µm or larger as measured by a Coulter counter, of generally 30% or less, particularly 20% or less, more particularly 10% or less, further particularly 5% or less. Further, the resin powder of the present invention desirably has a weight percent of coarse particles having particle diameters of 20 µm or larger as measured by a Coulter counter, of preferably 20% or less, more preferably 10% or less, further preferably 5% or less.

The resin powder of the present invention must cause softening and fusion bonding when heated after application. Therefore, the present resin powder desirably has a softening point of generally 50–120° C., preferably 70–110° C.

The resin powder of the present invention comprises mainly a film-forming resin and a crosslinking agent capable of giving rise to a crosslinking reaction with the resin.

As the film-forming resin, there can be used those used in production of conventional powder coatings as a binder resin. There can be used, for example, thermoplastic resins such as styrene resin, acrylic resin, olefinic resin, polyamide resin, polycarbonate resin, polyether resin, polysulfone resin, polyester resin, epoxy resin, butadiene resin, fluororesin and the like; thermosetting resins such as urea resin, urethane resin, epoxy resin and the like; and blends of the above resins. Of these, preferred are a styrene resin, an acrylic resin, a fluororesin, an epoxy resin and a polyester resin; and more preferred are a styrene resin, an acrylic resin and a fluororesin because they can be easily obtained in the form of an emulsion polymer. An acrylic resin is particularly preferred because it is inexpensive and its coating film has excellent weatherability and durability.

These resins can each have a glass transition temperature (Tg) of generally 0–100° C., preferably 10–80° C., more preferably 20–70° C. Their gelation degrees are desired to be generally 0–50% by weight, preferably 0–30% by weight in terms of insoluble content when subjected to Soxhlet extraction under acetone refluxing.

The resin may be a complete polymer such as thermoplastic resin, or may be a polymer containing an oligomer, a prepolymer, etc. as seen in thermosetting resins. The resin includes a homopolymer, a copolymer, a block polymer, a graft copolymer, a polymer blend, etc.

The polystyrene resin preferably used in the present invention is a (co)polymer composed mainly of a styrene type monomer. Examples of the styrene type monomer include styrene, o-methylstyrene, m-methylstyrene, p-methylstyrene, α-methylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, 3,4-dichlorostyrene and p-chloromethylstyrene. Styrene is particularly preferred.

The other monomer copolymerizable with the styrene type monomer includes, for example, (meth)acrylates of $C_{1-20}$ aliphatic alcohol, such as methyl acrylate, ethyl acrylate, n-butyl acrylate, 2-ethylhexyl acrylate, methyl metacrylate, n-butyl methacrylate, isobutyl methacrylate and the like; vinyl esters such as vinyl formate, vinyl acetate, vinyl propinate, Vinyl Versatate (trade name) and the like; monoolefins such as ethylene, propylene, butylene, isobutylene and the like; and conjugated diolefins such as butadiene, isoprene, chloroprene and the like. Of these, (meth)acrylates are preferred.

The acrylic resin preferably used in the present invention is a (co)polymer composed mainly of at least one (meth) acrylic monomer. Examples of the (meth)acrylic monomer (s) constituting the resin include methyl acrylate, ethyl acrylate, n-butyl acrylate, isobutyl acrylate, propyl acrylate, n-octyl acrylate, dodecyl acrylate, lauryl acrylate, 2-ethylhexyl acrylate, stearyl acrylate, 2-chloroethyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, lauryl methacrylate, 2-ethylhexyl methacrylate and stearyl methacrylate. Of these monomers, preferred is a (meth)acrylic acid ester of an aliphatic alcohol having 1–12, preferably 3–8 carbon atoms, or a combination of two or more such esters.

The other monomer copolymerizable with the (meth) acrylic monomer includes, for example, the above-mentioned styrene type monomers; vinyl esters such as vinyl formate, vinyl acetate, vinyl propionate, Vinyl Versatate (trade name) and the like; monoolefins such as ethylene, propylene, butylene, isobutylene and the like; and conjugated diolefins such as butadiene, isoprene, chloroprene and the like. Of these, styrene is are preferred.

The fluororesin preferably used in the present invention is a (co)polymer composed mainly of at least one fluorine-containing monomer. As the fluorine-containing monomer constituting the fluororesin, there can be mentioned ethylene tetrafluoride, ethylene trifluoride, vinylidene fluoride, vinyl fluoride, propylene hexafluoride, fluorinated alkyl vinyl ether, vinyl alcohol-fluorinated fatty acid ester, fluorinated alkyl acrylate, etc.

As the other monomer copolymerizable with the fluorine-containing monomer, there can be mentioned, for example, the above-mentioned (meth)acrylic monomers; and alkyl vinyl ethers such as methyl vinyl ether, ethyl vinyl ether, isopropyl vinyl ether, n-butyl vinyl ether, isobutyl vinyl ether, n-amyl vinyl ether, isoamyl vinyl ether, 2-ethylhexyl vinyl ether, cyclohexyl vinyl ether, octadecyl vinyl ether and the like.

The resin constituting the resin powder, preferably contain a polar group(s). The polar group(s) contained in the resin include, for example, acidic polar groups such as carboxyl group, sulfone group, phosphoric acid group, formyl group and the like; basic polar groups such as amino group and the like; and neutral polar groups such as amide group, hydroxyl group, cyano group, epoxy group and the like.

The polar group(s) can be introduced into the resin by a reaction such as copolymerization, condensation polymerization or addition polymerization of monomer having a polar group(s). The monomer having a polar group(s) can be used in an amount of preferably 0.01–50% by weight, more preferably 0.1–30% by weight based on the amount of the total monomers.

Of the monomers having a polar group(s), the monomers having an acidic polar group(s) include, for example, an α,β-ethylenically unsaturated compound having a carboxyl group(s) and an α,β-ethylenically unsaturated compound having a sulfone group(s).

The α,β-ethylenically unsaturated compound having a carboxyl group(s) include, for example, acrylic acid, methacrylic acid, fumaric acid, maleic acid, itaconic acid, cinnamic acid, monomethyl maleate, monobutyl maleate and monooctyl maleate. The α,β-ethylenically unsaturated compound having a sulfone group(s) include, for example, sulfonated ethylene, sodium salt thereof, allylsulfosuccinic acid, octyl allylsulfosuccinate.

Of the monomers having a polar group(s), the monomers having a basic polar group(s) include, for example, (meth) acrylic acid esters of aliphatic alcohols of 1–12, preferably 2–8, particularly preferably 2–4 carbon atoms, containing an amino group, a salt thereof or a quaternary ammonium group, vinyl compounds having, as substituents, heterocyclic groups containing N as a ring member(s); and N,N-diallyl-alkylamines or quaternary ammonium salts thereof. Of these monomers, (meth)acrylic acid esters of aliphatic alcohols containing an amino group, a salt thereof or a quaternary ammonium group, are preferred as a comonomer having basicity.

The (meth)acrylic acid esters of aliphatic alcohols containing an amino group, a salt thereof or a quaternary ammonium group, include, for example, dimethylaminoethyl acrylate, dimethylaminoethyl methacrylate, diethylaminoethyl acrylate, diethylaminoethyl methacrylate, quaternary salts thereof, 3-dimethylaminophenyl acrylate and 2-hydroxy-3-methacryloxypropyl trimethyl ammonium salt.

The vinyl compounds having, as a substituent(s), a heterocyclic group(s) containing N as a ring member(s) include, for example, vinylpyridine, vinylpyrrolidone, vinyl-N-methylpyridinium chloride and vinyl-N-ethylpyridinium chloride.

The quaternary ammonium salts of N-diallylalkylamine include, for example, N,N-diallyl methyl ammonium chloride and N,N-diallyl ethyl ammonium chloride.

Of the monomers having a polar group(s), the monomers having a neutral polar group(s) include (meth)acrylamide or a derivative thereof wherein the N atom of (meth)acrylamide is substituted with one or two alkyl groups having 1–18 carbon atoms; a (meth)acrylic acid ester having a hydroxyl group(s); a (meth)acrylonitrile having a cyano group(s); a (meth)acryloglycidyl having an epoxy group(s); an alkylglycidyl ether of (meth)allyl alcohol; and so forth.

The (meth)acrylamide or a derivative thereof wherein the N atom of (meth)acrylamide is substituted with one or two alkyl groups having 1–18 carbon atoms, includes, for example, acrylamide, N-butylacrylamide, N,N-dibutylacrylamide, piperidylacrylamide, methacrylamide, N-butylmethacrylamide, N,N-dimethylacrylamide and N-octadecylacrylamide.

The (meth)acrylic acid ester having a hydroxyl group(s) includes, for example, 2-hydroxyethyl (meth)acrylate and 2-hydroxypropyl (meth)acrylate.

The (meth)acryloglycidyl having an epoxy group(s) includes, for example, glycidyl (meth)acrylate, β-methylglycidyl (meth)acrylate and N-glycidyl(meth)acrylamide.

The monomers having a carboxyl group(s) as a polar group(s), used in condensation polymerization or addition polymerization, include, for example, aromatic dicarboxylic acids such as terephthalic acid, isophthalic acid, phthalic acid, phthalic anhydride, benzene-1,2,4-tricarboxylic acid, benzene-1,2,5-tricarboxylic acid, naphthalene-2,5,7-tricarboxylic acid, naphthalene-1,2,4-tricarboxylic acid and the like; aliphatic carboxylic acids such as oxalic acid, malonic acid, succinic acid, glutaric acid, adipic acid, hexahydrophthalic anhydride, itaconic acid, maleic acid, fumaric acid, mesaconic acid, citraconic acid, 1,2,4-butanetricarboxylic acid, hexane-1,2,5-tricarboxylic acid, 1,3-dicarboxy-2-carboxymethylpropene, 1,3-dicarboxy-2-methyl-2-carboxymethylpropane, tetra(carboxymethyl)methane, octane-1,2,7,8-tetracarboxylic acid, maleic anhydride and the like; and alicyclic carboxylic acids and anhydrides thereof, such as tetrahydrophthalic acid, hexahydrophthalic acid, methyltetrahydrophthalic acid, methylhexahydrophthalic acid, methylhymic acid, trialkyltetrahydrophthalic acid, methylcyclohexenedicarboxylic acid and the like.

The monomers having an amino group(s) as a polar group(s), used in condensation polymerization or addition polymerization, include, for example, chain aliphatic amines such as ethylenediamine, diethylenetriamine, triethylenetetramine, tetraethylenepentamine, dipropylenediamine, diethylaminopropylamine, hexamethylenediamine and the like; cyclic amines such as menthenediamine, isophoronediamine, bis(4-amino-3-methyidicyclohexyl)methane, diaminodicyclohexylmethane, bis(aminomethyl)cyclohexane, N-aminoethylpiperazine and the like; and aromatic amines such as m-phenylenediamine, diaminodiphenylmethane, diaminodiphenylsulfone, diaminodiethyidiphenylmethane and the like.

The monomers having a hydroxyl group(s) as a polar group(s), used in condensation polymerization or addition polymerization, include, for example, water; aliphatic diols such as ethylene glycol, propylene glycol, hexylene glycol, glycerine, trimethylenepropane, hexanetriol, triethanolamine, diglycerine, pentaerythritol, methyl glycoside and the like; and hydroxyphenyl-substituted aliphatic compounds such as 1,1-bis(4-hydroxyphenyl)methane, 2,2-bis(4-hydroxyphenyl)propane and the like; and etherified bisphenol compounds such as polyoxyethylene (2,2)-2,2-bis(4-hydroxyphenyl)propane, polyoxyethylene (4,0)-2,2-bis(4-hydroxyphenyl)propane, polyoxypropylene (2,2)-2,2-bis(4-hydroxyphenyl)propane and the like.

As the monomers having a polar group(s), used in condensation polymerization or addition polymerization, there can also be used, for example, compounds wherein a sulfone group, a phosphoric acid group, a formyl group or the like is bonded to one of the above-mentioned compounds.

The curing agent used in the resin powder of the present invention together with the above-mentioned binder resin has no particular restriction and can be any curing agent as long as it can give rise to a cross-linking reaction with the binder resin at the baking temperature of the coating film formed, to cure the coating film three-dimensionally. There can be used those curing agents used in conventional powder coatings. A curing agent which is a solid or a hydrophobic liquid at normal temperature, is particularly preferred.

The curing agent can be any curing agent having a reactive group(s) complementarily reactive with the polar group(s) which may be possessed by the binder resin, such as water-dispersible blocked isocyanate, water-dispersible epoxy resin, water-dispersible amino resin, water-dispersible aziridine compound, polycarboxylic acid compound or the like. The curing agent is preferably a low-molecular weight curing agent because it can uniformly diffuse into a coating film during film formation and improve the properties of the film in impact resistance, solvent resistance, etc. Particularly preferable as the curing agent are low-molecular weight polyepoxy compounds such as bisphenol A-epichlorohydrin condensate, diepoxy compound having a polyether chain as the skeleton, alicyclic epoxy compound and the like; low-molecular weight polyisocyanate compounds such as blocked aliphatic polyisocyanate, blocked aromatic polyisocyanate, blocked alicyclic polyisocyanate and the like; and low-molecular polybasic acids such as aliphatic polycarboxylic acid (e.g. succinic acid or adipic acid), aromatic polycarboxylic acid (e.g. phthalic acid or isophthalic acid) and the like. The low-molecular weight curing agent desirably has a molecular weight of generally 10,000 or less, preferably 3,000 or less, more preferably 1,000 or less.

These curing agents can be used singly or in combination of two or more kinds, in a total amount of 1–300 parts by weight, preferably 3–200 parts by weight, more preferably 5–100 parts by weight per 100 parts by weight of the binder resin.

The resin powder of the present invention can comprise a coloring agent as necessary. The coloring agent usable in the resin powder can be exemplified by pigments such as inorganic pigment, organic pigment and the like; and dyes such as organic dye and the like. These pigments and dyes can be used in combination of two or more kinds, as necessary.

Suitable as the inorganic pigment are metal powder type pigments such as zinc powder, iron powder, copper powder and the like; metal oxide type pigments such as magnetite, ferrite, red iron oxide, titanium oxide, zinc oxide, silica, chromium oxide, ultramarine, cobalt blue, cerulean blue, mineral violet, trilead tetroxide and the like; carbon type pigments such as carbon black, thermatomic carbon, lamp black, furnace black and the like; sulfide type pigments such as zinc sulfide, cadmium red, selenium red, mercury sulfide, cadmium yellow and the like; chromate type pigments such as molybdenum red, barium yellow, strontium yellow, chromium yellow and the like; ferrocyanide compound type pigments such as Milori blue and the like; and so forth.

The organic pigment includes azo type pigments such as Hansa Yellow G, Benzidine Yellow, Benzidine Orange, Permanent Red 4R, Pyrazolone Red, Lithol Red, Brilliant Scarlet G, BON Maroon Light and the like; acid dye type pigments and basic dye type pigments obtained by precipitating, with a precipitating agent, dyes such as Orange II, Acid Orange R, Eosine, Quinoline Yellow, Tartrazine Yellow, Acid Green, Peacock Blue, Alkali Blue and the like, or by precipitating, with tannic acid, tartar emetic, PTA, PMA, PTMA or the like, dyes such as Rhodamine, Magenta, Malachite Green, Methyl Violet, Victoria Blue and the like; mordant type pigments such as metal salt of hydroxyantraquinone, Alizarine Madder Lake and the like; phthalocyanine type pigments such as Phthalocyanine Blue, copper phthalocyanine sulfonate and the like; quinacridone type pigments and dioxane type pigments such as Quinacridone Red, Quinacridone Violet, Carbazole Dioxazine Violet and the like; other organic pigments such as organic fluorescent pigment, Aniline Black and the like; and so forth.

As the organic dye, there can be used a Nigrosine dye, an aniline dye, etc.

The kinds, combinations and amounts used of the above coloring agents can be appropriately determined depending upon the desired coating film formed. The amount used can be generally 300 parts by weight or less, preferably 200 parts by weight or less, more preferably 100 parts by weight or less per 100 parts by weight of the binder resin.

Specifically, for example, when the coating film formed is desired to have a hiding power for substrate, an inorganic pigment can be contained in an amount of 10 parts by weight or more, preferably 20 parts by weight or more, more preferably 30 parts by weight or more per 100 parts by weight of the binder resin. Conversely when no hiding power is required for the coating film in order to allow the substrate to be seen through, no coloring agent is contained or an organic pigment or dye is contained in an amount of 10 parts by weight or less, preferably 7 parts by weight or less, particularly preferably 5 parts by weight or less per 100 parts by weight of the binder resin, whereby a clear (color) coating can be produced. In order to allow the substrate to be seen through, a clear (color) coating is required to be able to give a coating film which is transparent, smooth, thin, etc. The powder coating composition of the present invention, which is superior in formability of a smooth and thin film, can be favorably used as a clear coating.

The powder coating of the present invention can further comprise, as necessary, additives which are contained in ordinary powder coatings, such as change control agent, film smoothness improver, fluiditity-imparting agent and the like.

The charge control agent can be exemplified by, for positive charging, electron-donating dye of nigrosine type, metal salt of naphthenic acid or higher fatty acid, alkoxylated amine, quaternary ammonium salt, alkylamide, chelate, pigment, fluorine-treated activating agent and the like; and, for negative charging, electron-accepting organic complex, chlorinated paraffin, chlorinated polyester, acid group-excessive polyester, sulfonylamine of copper phthalocyanine and the like. By using such a charge control agent, it is possible to use, in electrostatic coating, a spray gun of tribo-electrifying type, corona-electrifying type or the like.

The film smoothness improver includes, for example, olefin-based resins (e.g. low-molecular weight polyethylene, low-molecular weight polypropylene, oxidized polyethylene and polyethylene tetrafluoride), an epoxy resin, a polyester resin, a styrene-butadiene copolymer (monomer ratio=5/95 to 30/70), olefin copolymers (e.g. ethylene-acrylic acid copolymer, ethylene-acrylic acid ester copolymer, ethylene-methacrylic acid copolymer, ethylene-methacrylic acid ester copolymer, ethylene-vinyl chloride copolymer, ethylene-vinyl acetate copolymer and ionomer resin), a polyvinylpyrrolidone, a methyl vinyl ether-maleic anhydride copolymer, a maleic acid-phenol resin and a phenol-modified terpene resin, with olefin-based resins being preferred. These resins are used preferably in the form of an aqueous emulsion.

The fluidizing agent as necessary contained in the resin powder of the present invention can be exemplified by inorganic fine powders of hydrophobic silica, titanium oxide, aluminum oxide, etc. They can be used in an amount of about 0.01–5 parts by weight, preferably about 0.1–1 part by weight per 100 parts by weight of the resin powder.

The resin powder of the present invention may be subjected to a surface treatment with a coupling agent such as silane coupling agent, titanium coupling agent or the like for the purposes of moisture resistance improvement, etc.

Production of the present resin powder having the above-mentioned particle shape feature and composition may be conducted, for example, by a melting and grinding process which comprises dry-blending the above-mentioned resin and curing agent and, as necessary, a coloring agent, a change control agent, a smoothness improver, a fluidity-imparting agent, etc., melt-kneading the resulting blend by the use of an extruder or the like, and grinding the kneaded product to obtain powder particles; or by a suspension polymerization process which comprises uniformly mixing monomer components for resin with a curing agent, a polymerization catalyst and, as necessary, a coloring agent, an antistatic agent, a smoothness improver, a fluidity-imparting agent, etc., suspension-polymerizing the resulting mixture in an aqueous medium to obtain powder particles. However, the resin powder of the present invention can be produced most convenientaly by a resin fine particles agglomeration process developed by the present inventors, which comprises agglomerating the resin fine particles obtained by emulsion polymerization or the like, to desired particle diameters in an aqueous medium to convert into associated particles, and heating the associated particles to fusion-bond them to obtain powder particles.

The resin fine particles agglomeration process is described in more detail below.

The resin fine particles agglomeration process basically comprises mixing an aqueous dispersion of resin fine particles having a volume-average particle diameter of preferably 0.01–2 $\mu$m, with an aqueous dispersion of a curing agent to agglomerate the resin fine particles in an aqueous medium to form an dispersion of associated particles having a volume-average particle diameter of preferably 4–20 $\mu$m, subjecting the dispersion of associated particles to a fusion bonding treatment, and drying the dispersion to obtain resin particles having a volume-average particle diameter of 3–17 $\mu$m.

The resin fine particles used in the above process as a starting material can be produced, for example, by a method of finely grinding the mass, flakes, etc. of the above-mentioned resin or a method of suspension-polymerizing or emulsion-polymerizing the above-mentioned monomer(s). However, it is preferable to produce the resin fine particles by a method of subjecting the above-mentioned unsaturated monomer(s) to emulsion polymerization to obtain emulsion particles because it can produce particles of very small and relatively uniform diameters.

The emulsion polymerization can be conducted by a per se known method, for example, by adding a monomer(s) and a polymerization initiator to a heated aqueous solution of a surfactant (emulsifier) or a protective colloid. The surfactant used in the emulsion polymerization may be any of a nonionic surfactant, an anionic surfactant, a cationic surfactant and an amphoteric surfactant.

The nonionic surfactant includes, for example, polyoxyalkylene alkyl ethers such as polyoxyethylene lauryl ether, polyoxyethylene stearyl ether and the like; plyoxyalkylene alkyl phenyl ethers such as polyoxyethylene octyl phenol ether, polyoxyethylene nonyl phenol ether and the like; sorbitan-fatty acid esters such as sorbitan monolaurate, sorbitan monostearate, sorbitan trioleate and the like; polyoxyalkylene sorbitan-fatty acid esters such as polyoxyethylene sorbitan monolaurate and the like; polyoxyalkylene-fatty acid esters such as polyoxyethylene monolaurate, polyoxyethylene monostearate and the like; glycerine-fatty acid esters such as monoglyceride of oleic acid, monoglyceride of stearic acid and the like; and polyoxyethylene-polypropylene block copolymers.

The anionic surfactant includes, for example, fatty acid salts such as sodium stearate, sodium oleate, sodium laurate and the like; alkylarylsulfonic acid salts such as sodium dodecylbenzenesulfonate and the like; alkyl sulfates such as sodium lauryl sulfate and the like; alkyl sulfosuccinate salts and derivatives thereof, such as sodium monooctyl sulfosuccinate, sodium dioctyl sulfosuccinate, sodium polyoxyethylene lauryl sulfosuccinate and the like; polyoxyalkylene alkyl ether sulfate salts such as sodium polyoxyethylene lauryl ether sulfate and the like; and polyoxyalkylene alkyl aryl ether sulfates such as sodium polyoxyethylene nonyl phenol ether sulfate and the like.

The cationic surfactant includes, for example, alkylamine salts such as laurylamine acetate and the like; quaternary ammonium salts such as lauryl trimethyl ammonium chloride, alkylbenzyl dimethyl ammonium chloride and the like; and polyoxyethylalkylamines. The amphoteric surfactant includes, for example, alkyl betaines such as lauryl betaine and the like.

There can also be used those surfactants obtained by replacing part of the hydrogen atoms of alkyl group of one of the above-mentioned surfactants, with a fluorine atom(s).

There can also be used so-called reactive surfactants which are the above-mentioned surfactants having, in the molecule, a radical-copolymerizable unsaturated bond(s). Such reactive surfactants include reactive surfactants of sulfosuccinic acid salt type, alkenylsuccinic acid salt type or the like.

Specific examples of the reactive surfactant of sulfosuccinic acid salt type include Latemul S-120, Latemul S-120A, Latemul S-180 and Latemul S-180A (trade names, products of Kao Corporation) and Eleminol JS-2 (trade name, product of Sanyo Chemical Industries, Ltd.). Specific examples of the reactive surfactant of alkenylsuccinic acid salt type include Latemul ASK (trade name, product of Kao Corporation).

Further, the reactive anionic surfactants usable suitably in the present invention include salts of sulfoalkyl ($C_{1-4}$) esters of aliphatic unsaturated carboxylic acids ($C_{3-5}$), for example, salts of sulfoalkyl (meth)acrylates such as sodium salt of 2-sulfoethyl (meth)acrylate, ammonium salt of 3-sulfopropyl (meth)acrylate and the like; and salts of alkylsulfoalkyl diesters of aliphatic unsaturated dicarboxylic acids, such as sodium salt of alkyl sulfopropylmaleate, ammonium salt of polyoxyethylene alkyl sulfopropylmaleate, ammonium salt of polyoxyethylene alkyl sulfoethylfumarate, salt of alkyl diester of sulfoethylfumarate and the like.

As the reactive anionic surfactants, there can also be used, for example, a salt of sulfuric acid ester of alkyl phenol ether of dipolyethylene glycol maleate, a salt of sulfuric acid ester of dihydroxyethyl phthalate (meth)acrylate, a salt of sulfuric acid ester of 1-allyloxy-3-alkylphenoxy-2-polyoxyethylene glycerol ether [Adeka Soap SE-10N (trade name), product of Asahi Denka Kogyo K.K.], and a salt of sulfuric acid ester of polyoxyethylene alkyl alkenyl phenol [Aquaron (trade name), product of Daiichi Kogyo Seiyaku Co., Ltd.].

These surfactants can be used singly or in appropriate combination. The reactive anionic surfactant can be used in appropriate combination, when necessary, with one of the above-mentioned ordinary anionic surfactants (non-reactive) and/or nonionic surfactants.

Of these surfactants, there are preferred, from the standpoint of the small amount of agglomerate generated during emulsion polymerization, nonionic surfactants such as polyoxyalkylene alkyl ether and polyoxyalkylene alkyl phenol ether; and anionic surfactants such as salt of alkyl arylsulfonate, salt of alkyl sulfate, salt of alkyl sulfosuccinate and derivative thereof, salt of polyoxyalkylene alkyl ether sulfate and salt of polyoxyalkylene alkyl phenol ether sulfate. Use of reactive surfactant is also advisable in view of the excellency in properties such as adhesivity to substrate and water resistance.

These surfactants can be used in an amount of generally about 0.03–10% by weight, preferably about 0.05–7% by weight, particularly about 0.1–5% by weight based on the total amount of the monomers.

The protective colloid usable in the emulsion polymerization includes, for example, polyvinyl alcohols such as partially saponified polyvinyl alcohol, completely saponified polyvinyl alcohol, modified polyvinyl alcohol and the like; cellulose derivatives such as hydroxyethyl cellulose, hydroxypropyl cellulose, carboxymethyl cellulose and the like; and natural polysaccharides such as guar gum and the like. These compounds can be used singly or in combination of two or more kinds, or in combination with the above-mentioned surfactant. The amount of the protective colloid used can be determined appropriately, but the appropriate amount is generally about 0–10% by weight, preferably about 0.05–5% by weight, particularly preferably about 0.05–2% by weight based on the total weight of the monomers used.

The polymerization initiator usable in the emulsion polymerization can be exemplified by persulfuric acid salts such as sodium persulfate, potassium persulfate, ammonium persulfate and the like; organic peroxides such as t-butyl hydroperoxide, cumene hydroperoxide, p-menthane hydroperoxide and the like; and hydrogen peroxide. These compounds can be used singly or in combination of two or more kinds. The amount of the polymerization initiator used is not strictly restricted, but is generally about 0.05–1% by weight, preferably about 0.1–0.7% by weight, particularly about 0.1–0.5% by weight based on the total weight of the monomers used.

In the emulsion polymerization, a reducing agent can be used as desired. The reducing agent can be exemplified by reducing organic compounds such as ascorbic acid, tartaric acid, citric acid, grape sugar and the like; and reducing inorganic compounds such as sodium thiosulfate, sodium sulfite, sodium bisulfite, sodium metabisulfite and the like. The amount of the reducing agent used is, for example, about 0.05–1% by weight based on the total weight of the monomers used.

In carrying out the emulsion polymerization, the predetermined total amount of surfactant can be added beforehand to the reaction system. It is also possible to add part of the surfactant beforehand to the reaction system and initiate a reaction and, in the middle of the reaction, add the rest of the surfactant continuously or at intervals in divided portions, and this approach is preferable. The monomer(s) and other comonomer(s) used as desired for modification purpose can also be added in one lump, divided portions or continuously; however, continuous addition is preferable for reaction control.

During the emulsion polymerization, besides the surfactant and the polymerization initiator, there can also be added, as necessary, a pH-controlling agent, a polymerization degree-controlling agent, a defoaming agent, etc.

The emulsion polymerization using the above-mentioned mentioned raw materials can be conducted by a per se known process, whereby an emulsion of resin fine particles having a volume-average particle diameter of generally 0.01–2 $\mu$m, preferably 0.05–1 $\mu$m can be obtained.

The thus-obtained resin fine particles emulsion is mixed with an aqueous dispersion containing the above-mentioned curing agent and, as necessary, a coloring agent, a change control agent, a smoothness improver, a fluidity-imparting agent, etc., and the resulting mixed dispersion is subjected to agglomeration of particles to form associated particles. The associated particles can have a volume-average particle diameter of generally 4–20 $\mu$m, preferably 4–14 $\mu$m, more preferably 6–12 $\mu$m.

The associated particles may be formed directly from the resin fine particles, or may be formed by forming secondary particles from the resin fine particles and then agglomerating the secondary particles so as to have the above-mentioned particle diameter. The latter method is preferable because it can easily control the particle diameter.

In forming the associated particles directly from the resin fine particles, there can be used, for example, a spray drying method which comprises spraying the above-mentioned mixed dispersion and drying the resulting droplets at a high temperature to forcibly associate the resin fine particles present in the droplets, together with the curing agent, etc.; and an in aqueous-medium association method which comprises applying pH adjustment or adding a salt, a curing agent or the like to an aqueous dispersion of the resin fine particles, for example, a resin fine particles emulsion produced as mentioned above, to reduce the stability of the aqueous dispersion of the resin fine particles and forcibly associate the particles in an aqueous medium. The in-aqueous-medium association method, which comprises associating the particles in an aqueous medium to obtain associated particles, is preferred because the method can provide strong particles resistant to disintegration.

Meanwhile, the secondary particles can be obtained by agglomerating the resin fine particles together with the curing agent, etc., for example, by a method of applying a treatment (e.g. heating, pH adjustment, salt addition or curing agent addition) to a stable dispersion of the fine polymer particles (e.g. a polymer emulsion) to reduce the stability of the mixed dispersion and forcibly bond the particles and, during the agglomeration, controlling the conditions of the above treatment to allow the resulting agglomerate to have a volume-average particle diameter of generally 0.05–2.5 $\mu$m, preferably 0.1–2 $\mu$m, more preferably 0.5–1.5 $\mu$m.

By applying, to the above-obtained secondary particles, the same treatment as used for obtaining the secondary particles and, during the treatment, controlling the treatment conditions and time, to agglomerate the secondary particles, there can be obtained associated particles having desired particle diameters.

The thus-obtained associated particles have random and irregular shapes of very rough surfaces. When the aqueous dispersion of the associated particles is continuously stirred at a temperature in the range of Tg (of the resin constituting the particles) to (Tg+85) °C., the contact area between the resin fine particles and/or between the secondary particles is fusion-bonded and individual particles are melted into bonded particles; simultaneously therewith, the random and irregular shapes of rough surfaces, of the associated particles change gradually into smooth surfaces and nearly spherical shapes, and the volume-average particle diameter becomes slightly smaller. This fusion-bonding treatment can be conducted generally for about 1–6 hours, preferably for about 2–4 hours.

The fusion-bonded associated particles obtained above are separated from the dispersion and dried, whereby the resin powder of the present invention can be obtained.

The powder coating composition of the present invention comprising the above-mentioned resin powder, since the resin powder is fine and uniform and has a particular particle shape close to a sphere, is stable in charge amount and uniform in charge amount distribution, is superior in fluidity of powder particles, and can form a coating film of smoothness and luster in a small film thickness.

With the resin powder of the present invention, a powder coating composition having any desired color can be produced by mixing at least two kinds of colored resin powders of different colors. When this powder coating composition consisting of a mixture of at least two kinds of colored resin powders of different colors is applied, a coating film having a visually uniform color can be obtained. This visually uniform color of coating film refers to such a color of coating film that when an ordinary person looks at the film at a site 1 m apart from the coating film, the person does not recognize the presence of coating particles of different colors in the film but recognizes the film as if the film is made of a powder coating consisting of particles of the same one color. The color of the coating film made from a mixture of two or more colored resin powders of different colors is different from the individual colors and is a mixed color of the individual colors.

Therefore, according to the present invention, by producing colored resin powders of limited colors (fundamental colors) and by examining, in advance, the relation between the compounding proportions of these colored resin powders and the colors of the coating films obtained from the compounded coatings, a powder coating capable of forming a coating film of any desired color can be provided easily in a short time by appropriately selecting the colored resin powders and compounding the selected powders so as to give a desired film color.

The powder coating composition of the present invention can be applied onto a material to be coated, by a per se known powder coating method by the use of a per se known powder coating apparatus. For example, the powder coating of the present invention can be applied onto a substrate such as metal plate, plastic, wood, inorganic material or the like by electrostatic coating or fluidized-dipping, whereby a coating film superior in appearance and performance can be formed on the substrate. The thickness of the film formed is not particularly restricted and can be varied in a wide range depending upon the kind of substrate, the application of a coated substrate, etc. The powder coating of the present invention, as compared with ordinary powder coatings, can form a coating film which is uniform and smooth and has a hiding power even when the film is thin. The film thickness can be generally 5–100 $\mu$m, preferably 10–40 $\mu$m, more preferably 15–35 $\mu$m.

EXAMPLES

The present invention is described more specifically below by way of Examples. The test methods and evaluation methods used in the Examples are as follows.

(1) Preparation of test pieces (a) Preparation of coated test pieces in Examples 1–5 and Comparative Example 1

Examples 1–5 and Comparative Example 1 are cases using an enamel coating. In these cases, preparation of coated test pieces was conducted as follows. A cationic electrocoating (U-600, a product of Nippon Paint Co., Ltd.) was electrocoated on a steel plate for automobile, specified by JIS G 3141 to obtain an electrocoated steel plate (hereinafter referred to as "ED plate" in some cases) of 0.8 mm (thickness)×100 mm×200 mm. Onto the ED plate was applied, by electrostatic coating, a powder coating by the use of a commercial corona-electrifying type spray gun so as to give a film thickness of 30 $\mu$m as baked. The applied voltage was 60 KV and the particles of the powder coating were charged negatively. Then, baking was conducted at 180° C. for 30 minutes to prepare various coated test pieces.

(b) Preparation of coated test pieces in Examples 6–9 and Comparative Examples 2–4

Examples 6–9 and Comparative Examples 2–4 are cases using a clear (color) coating. In these cases, preparation of coated test pieces was conducted as follows. The following coating compound was fed into a glass bottle together with glass beads, and the glass bottle was subjected to stirring for 2 hours by the use of a paint shaker to prepare an intermediate coating.

Acrylic resin (solid content: 50% by weight) 100 parts by weight
  Resin composition:
    n-butyl acrylate/styrene/2-hydroxyethyl methacrylate/methacrylic acid=68/20/10/2
  Methyl isobutyl ketone solution Mn=8,000, Mw/Mn=5.6
Melamine resin 20 parts by weight Cymel 303 (a product of American Cyanamid Co.) Titanium oxide 30 parts by weight CR-90 (a product of Ishihara Sangyo Kaisha, Ltd.)

The above intermediate coating was sprayed, by air spraying, on an ED plate of 0.8 mm (thickness)×100 mm×200 mm obtained by applying a cationic electrocoating (U-600, a product of Nippon Paint Co., Ltd.) on a steel plate for automobile, specified by JIS G 3141, so as to give a film thickness of 50 $\mu$m as dried, followed by baking at 160° C. or 20 minutes. The resulting plate had a 60° luster of 92.

To the above-obtained ED plate coated with an intermediate coating was applied, by electrostatic coating, one of the powder coatings of Examples 6–9 and Comparative Examples 2–4 by the use of a commercial 10 corona-electrifying type electrostatic coating machine GX-3600S (a product of ONODA CEMENT CO., LTD.) so as to give a film thickness of 30 $\mu$m as baked. The applied voltage was 60 KV and the particles of the powder coating were charged negatively. Then, baking was conducted at 180° C. for 30 minutes to prepare various coated test pieces.

(2) Method for measurement of SF

The image of a powder particles sample was processed by the use of an image processor and analyzer LUZEX 3U (a product of Nikon Corporation), and the SF of the sample was determined as follows.

First, the SF's of 100 particles of the sample were measured and an average S of the SF's was calculated. Then, a circular coin having no notches at the periphery, which was relatively new and had neither damage nor deformation, for example, a Japanese one-yen coin, was selected and measured for its SF, which was termed as T. T was divided by 100 and the resulting value was termed as a correction factor f. The above-obtained S was divided by f and the resulting value was used as the SF of the sample particles.

(3) Particle diameter and its distribution

A 100-$\mu$m orifice was fitted to a Coulter multisizer (a product of Nikkaki K.K.), and measurement was made for a sample. From the measurement result was obtained a volume-average particle diameter; a small index ratio and a large index ratio were calculated; and a number percent of particles of 4 $\mu$m or smaller and a weight percent of particles of 30 $\mu$m or larger and 20 $\mu$m or larger were read.

(4) Softening point of powder particles

The softening point of a sample was measured by the use of Shimadzu Flow Tester OFT 500 (a product of Shimadzu Corporation) under the following conditions.

Sample weight: 1±0.01 g
  Load: 30 kg
  Nozzle: 1 mm (diameter)×10 mm
  Temperature elevation rate: 3° C./min
  Preheating time: 4 min
  Starting temperature: 80° C.

Distance and temperature were recorded from the start of flowing to the end, and the temperature at the intermediate point from the starting time and the final time was taken as the softening point of the sample.

(5) Fluidity of powder

The angle of repose of a sample was measured by the use of a powder tester (a product of Hosokawa Micron K.K.).

(6) Coatability

A powder coating was coated by the use of the following commercial electrostatic coating machines to observe and evaluate the stability of feeding into the gun and the stability of discharging from the gun.

Electrostatic coating machines
  A: GX-3600S (a product of ONODA CEMENT CO., LTD.)
  B: EXB56735 (a product of Hosokawa Micron K.K.)
  C: MPS1-F (RANSBURG INDUSTRIE CO., INC.)
    Evaluation was made based on the following standard.
  ○: The powder coating is discharged continuously from the gun, and smooth coating is possible.
  Δ: The discharging of the powder coating is discontinuous and coatability is poor.
  X: The powder coating has low fluidity and is not discharged from the gun.

(7) Luster

Each of the coated test pieces obtained in the above (1) was measured for 60° mirror-surface luster by the use of a color analyzer (TOPSCAN MODEL TC-1800 MKII, a product of Tokyo Denshoku K.K.).

(8) Hiding power for substrate

Hiding power for substrate was measured as follows in Examples 1–5 and Comparative Example 1 each using an enamel coating.

A coated test piece was prepared in the same manner as in the above (1) except that a powder coating was applied so as to give a film thickness (as baked) of about 20 μm in place of about 30 μm, and the appearance was evaluated visually according to the following standard.

○: The substrate is not seen through.

Δ: The substrate is slightly seen through owing to the unevenness of the film, at the dented portions of the film.

X: The film has high unevenness and the substrate is seen through as spots, at the dented portions of the film.

(9) Color

In Examples 6–9 and Comparative Examples 2–4 each using a clear (color) coating, the appearance of coating film was observed; further, the color of coating film of present powder coating was compared with the color of dried coating film of a solvent type coating produced as follows.

First, into a reactor equipped with a stirrer, a reflux condenser and a thermometer were fed 100 parts by weight of ethyl acetate and 0.3 part by weight of azobisisobutyronitrile (a polymerization initiator), and the mixture was heated to 70° C. while nitrogen was blown thereinto. Then, while the reactor inside was kept at 70° C., there was added thereto in 4 hours continuously a monomers mixture consisting of 20 parts by weight of styrene, 25 parts by weight of methyl methacrylate, 40 parts by weight of butyl acrylate, 15 parts by weight of glycidyl methacrylate and 0.3 part by weight of azobisisobuytronitrile. The resulting mixture was heated for 4 hours and then cooled, and 20 parts by weight of toluene was added to obtain a polymer solution having about 45% by weight of a solid content.

The polymer solution was mixed with the same coloring agents as used in each powder coating used for comparison. The coloring agents were used in the same amounts as used in each powder coating, in terms of the proportion relative to the resin solid content. The resulting mixture was stirred to prepare various solvent type coatings wherein the components were dispersed uniformly. Each solvent type coating was coated on the above-mentioned ED plate coated with an intermediate coating, so as to give a coating film of 30 μm in thickness as dried, and the resulting film was dried. The color of coating film of powder coating was compared with the color of dried coating film of solvent type coating and evaluated according to the following standard.

○: There is no difference between the color of coating film of powder coating and the color of coating film of solvent type coating.

X: There is a difference between the color of coating film of powder coating and the color of coating film of solvent type coating.

(10) Adhesivity

To the surface of each of the coated test pieces which was obtained in the above (1) by coating so as to give a dried coating film of about 30 μm in thickness, was applied a crosscut tester (a product of Suga Shikenki K.K.), whereby cut lines having a depth reaching the steel surface of the test piece were made on the powder coating side of the test piece at intervals of 1 mm in both of the longitudinal and transverse directions of the test piece to form 100 squares per cm$^2$. To the thus-formed squares was attached a cellophane adhesive tape of 24 mm in width (a product of Nichiban Co., Ltd.); the attached tape was subjected to quick 180° peeling by hand; the number of the squares in which the coating film remained, was counted and expressed as said number/100.

(11) Impact resistance

Each of the coated test pieces obtained in (1) was subjected to a DuPont type impact test according to JIS K 5400. That is, a shock mold of 6.35±0.03 mm in radius and a receiving stand were fitted to a tester; a coated test piece was superimposed between the shock mold and the receiving stand, with the coating film side of the test piece directed upward; a weight of 500±1 g was dropped on the shock mold from various heights not exceeding 50 cm. The impact resistance of the coating film of the test piece was evaluated by the maximum height at which the coating film received no damage in peeling, cracking, etc.

Example 1

Into a reactor equipped with a stirrer, a refluxing condenser and a thermometer were fed 100 parts by weight of water, 1 part by weight of a nonionic surfactant [Emulgen 950 (trade name), a product of Kao Corporation], 1.5 parts by weight of an anionic surfactant [Neogen R (trade name), a product of Kao Corporation] and 0.5 part by weight of a polymerization initiator (potassium persulfate, KPS). The contents in the reactor was heated to 70° C. while nitrogen was blown thereinto. While the reactor inside was kept at the same temperature, there was continuously fed thereinto in 4 hours a monomers mixture consisting of 50 parts by weight of styrene (St), 35 parts by weight of butyl acrylate (BA), 15 parts by weight of glycidyl methacrylate (GMA) and 5 parts by weight of 2-mercaptoethanol, to give rise to polymerization for 8 hours to obtain a polymer emulsion having a solid content of about 50% by weight.

Then, there were mixed 200 parts by weight of the polymer emulsion, 12 parts by weight of dodecanedioic acid, 30 parts by weight of titanium oxide (TiO$_2$) (CR-80, a product of Ishihara Sangyo Kaisha, Limited) and 400 parts by weight of water, and the mixture was 20 stirred by a slusher for dispersion. Thereto was added nitric acid for pH adjustment to 1.2, after which the mixture was kept at about 30° C. for 2 hours. During this period, microscopic observation was made, which confirmed that the polymer particles agglomerated to secondary particles having particle diameters of about 1 μm. The mixture was heated to 70° C. with stirring and kept at that temperature for 3 hours. During this period, microscopic observation was made, which confirmed that the polymer particles agglomerated to associated particles having particle diameters of about 8 μm. The mixture was cooled; the resulting aqueous slurry was subjected to filtration with a Buchner funnel; and the resulting solid was washed with water and vacuum-dried at 50° C. for 10 hours to produce a powder coating.

The particles of the powder coating had a SF of 121.3.

100 parts by weight of the powder coating was mixed with 0.5 part by weight of a silica (Aerosil R-972, a product of NIPPON AEROSIL, CO., LTD.) as a fluidizing agent to prepare a powder coating for testing. The powder coating had a softening point of 100° C. and a volume-average particle diameter of 7.5 μm. Using the powder coating for testing, a coated test piece was prepared in accordance with the above (1). The properties of the powder coating and the coating film of the powder coating for testing are shown in Table 1 and Table 2.

The powder coating for testing had a small angle of repose and good powder fluidity, and accordingly had good coatability. The coating film formed with the coating powder for testing had smoothness and luster, and had a hiding power even when formed in a thin film.

Example 2

Powder particles having a volume-average particle diameter of 8.7 μm were obtained in the same manner as in Example 1 except that 50 parts by weight of St and 35 parts by weight of BA were changed to 45 parts by weight of methyl methacrylate (MMA) and 40 parts by weight of BA; image processing was conducted; a powder coating was produced in the same manner as in Example 1; and a coated test piece was prepared in accordance with the above (1).

Example 3

Powder particles having a volume-average particle diameter of 8.4 μm were obtained in the same manner as in Example 1 except that keeping of the mixture for 3 hours during the formation of associated particles was changed to keeping of the mixture for 6 hours; image processing was conducted; a powder coating was produced in the same manner as in Example 1; and a coated test piece was prepared in accordance with the above (1).

Example 4

Powder particles having a volume-average particle diameter of 9.2 μm were obtained in the same manner as in Example 1 except that keeping of the mixture at 70° C. during the formation of associated particles was changed to keeping of the mixture at 85° C.; image processing was conducted; a powder coating was produced in the same manner as in Example 1; and a coated test piece was prepared in accordance with the above (1).

Example 5

Into the same reactor as used in Example 1 were fed 300 parts by weight of water and 1 part by weight of a polyvinyl alcohol (Gosenol KH-17, a product of Nihon Gosei Kagaku Kogyo), and they were made into a solution. Thereto was added a uniform mixture consisting of 50 parts by weight of St, 35 parts by weight of BA, 15 parts by weight of GMA, 5 parts by weight of benzoyl peroxide and 5 parts by weight of 2-mercaptoethanol. The resulting mixture was vigorously stirred for dispersion. The resulting dispersion was heated to 70° C. and kept at that temperature for 5 hours. The dispersion was cooled. The resulting slurry was subjected to filtration with a Buchner funnel, and the resulting solid was washed with water and vacuum-dried at 50° C. for 10 hours to obtain powder particles having a volume-average particle diameter of about 50 μm.

100 parts by weight of the above polymer, 12 parts by weight of dodecanedioic acid and 30 parts by weight of titanium oxide were mixed. The mixture was melt-kneaded, subjected to coarse grinding and then to fine grinding by the use of a laboratory jet mill (a product of Nippon Pneumatic Kogyo K.K.) at an air pressure of 3 kg/cm$^2$, and treated for 5 minutes by the use of a hybridization system (NHS-1, a product of Nara Seisakusho K.K.) at 8,000 rpm (a standard rotor). The resulting powder was classified by the use of an air classifier (a product of Nippon Pneumatic Kogyo K.K.) at a controlled air volume at a controlled air speed, to obtain powder particles having a volume-average particle diameter of 14.1 μm. Then, a powder coating was produced in the same manner as in Example 1, and a coated test piece was prepared in accordance with the above (1).

Comparative Example 1

Powder particles were obtained in the same manner as in Example 5 except that no hybridization treatment was conducted. Then, a powder coating was produced in the same manner as in Example 1, and a coated test piece was prepared in accordance with the above (1).

The powder particles obtained had a large angle of repose and poor fluidity, tended to give slightly interrupted discharging during application, and showed poor coatability. The coating film formed had low smoothness and low luster and, when formed in a thin film, showed no sufficient hiding power for substrate.

Reference Example 1

Into a reactor equipped with a stirrer, a refluxing condenser and a thermometer were fed 100 parts by weight of water, 1 part by weight of a nonionic surfactant [Emulgen 950 (trade name), a product of Kao Corporation], 1.5 parts by weight of an anionic surfactant [Neogen R (trade name), a product of Kao Corporation] and 0.5 part by weight of a polymerization initiator (potassium persulfate, KPS). The contents in the reactor was heated to 70° C. with blowing nitrogen thereinto. While the reactor inside was kept at the same temperature, there was continuously fed thereinto in 4 hours a monomers mixture consisting of 20 parts by weight of styrene (St), 25 parts by weight of methyl methacrylate (MMA), 40 parts by weight of butyl acrylate (BA), glycidyl methacrylate (GMA) and 5 parts by weight of 2-mercaptoethanol, to give rise to polymerization for 8 hours to obtain a polymer emulsion having a solid content of about 50% by weight.

Then, there were mixed 200 parts by weight of the polymer emulsion, 12 parts by weight of dodecanedioic acid, 1 part by weight of Phthalocyanine Blue and 400 parts by weight of water, and the mixture was stirred by a slusher for dispersion. Thereto was added nitric acid for pH adjustment to about 1.0, after which the mixture was kept at about 30° C. for 2 hours. During this period, microscopic observation was made, which 15 confirmed that the polymer particles agglomerated to secondary particles having particle diameters of about 1 μm. The mixture was heated to 70° C. with stirring and kept at that temperature for 3 hours. During this period, microscopic observation was made, which confirmed that the secondary particles agglomerated to associated particles having particle diameters of about 8 μm. The mixture was cooled; the resulting aqueous slurry was subjected to filtration with a Buchner funnel; and the resulting solid was washed with water and vacuum-dried at 50° C. for 10 hours to produce a blue powder.

100 parts by weight of the powder was mixed with 0.5 part by weight of a silica (Aerosil R-972, a product of NIPPON AEROSIL, CO., LTD.) as a fluidizing 30 agent to prepare blue powder particles. The powder particles had a softening point of 100° C. and a volume-average particle diameter of 8.5 μm.

Reference Examples 2–3

Yellow powder particles and red powder particles were obtained in the same manner as in Reference Example 1 except that 1 part by weight of Phthalocyanine Blue was changed to 1 part by weight of Bismuth Yellow (Reference Example 2) and 1 part by weight of quinacridone (Reference Example 3).

Reference Example 4

A powder having a volume-average particle diameter of 18 μm was obtained in the same manner as in Reference Example 1 except that keeping of the mixture at 70° C. to form associated particles was changed to keeping of the mixture at 90° C. to form associated particles. The subsequent operation was the same as in Reference Example 1, to obtain blue powder particles.

Reference Example 5

Yellow powder particles were obtained in the same manner as in Reference Example 4 except that 1 part by weight of Phthalocyanine Blue was replaced by 1 part by weight of Bismuth Yellow.

Reference Example 6

A powder having a volume-average particle diameter of 2.5 µm was obtained in the same manner as in Reference Example 1 except that keeping of the mixture at 70° C. to form associated particles was changed to keeping of the mixture at 60° C. to form associated particles. The subsequent operation was the same as in Reference Example 1, to obtain blue powder particles.

Reference Example 7

Yellow powder particles were obtained in the same manner as in Reference Example 6 except that 1 part by weight of Phthalocyanine Blue was replaced by 1 part by weight of Bismuth Yellow.

Reference Example 8

Into the same reactor as used in Example 1 were fed 300 parts by weight of water and 1 part by weight of a polyvinyl alcohol (Gosenol KH-17, a product of Nihon Gosei Kagaku Kogyo), and they were made into a solution. Thereto was added a uniform mixture consisting of 40 parts by weight of St, 10 parts by weight of MMA, 35 parts by weight of BA, 15 parts by weight of GMA, 5 parts by weight of benzoyl peroxide and 5 parts by weight of 2-mercaptoethanol. The resulting mixture was vigorously stirred for dispersion. The resulting dispersion was heated to 70° C. and kept at that temperature for 5 hours. The dispersion was cooled. The resulting slurry was subjected to filtration with a Buchner funnel, and the resulting solid was washed with water and vacuum-dried at 50° C. for 10 hours to obtain powder particles having a volume-average particle diameter of about 50 µm.

100 parts by weight of the above polymer, 12 parts by weight of dodecanedioic acid and 1 part by weight of Phthalocyanine Blue were mixed. The mixture was melt-kneaded, subjected to coarse grinding and then to fine grinding by the use of a laboratory jet mill (a product of Nippon Pneumatic Kogyo K.K.) at an air pressure of 3 kg/cm$^2$, and classified by the use of an air classifier (a product of Nippon Pneumatic Kogyo K.K.) at a controlled air volume at a controlled air speed, to obtain powder particles. Then, the particles were subjected to the same silica treatment as in Reference Example 1, to obtain a blue powder coating.

Reference Example 9

Yellow powder particles were obtained in the same manner as in Reference Example 8 except that 1 part by weight of Phthalocyanine Blue was replaced by 1 part by weight of Bismuth Yellow.

Example 6

The powder particles obtained in Reference Example 1 and the powder particles obtained in Reference Example 2 were mixed on an equal weight basis to obtain a powder coating.

Using the powder coating, a coated test piece was prepared in accordance with the above (1). The properties and coatability of the resulting powder are shown in Table 1 and the measurement results of the properties of the coating film obtained are shown in Table 2. The powder had good fluidity and could be applied with a commercial coating machine, and the coating film had good luster and a uniform green color (neither blue particles nor yellow particles were recognized visually).

Examples 7–9

Powder coatings and coated test pieces were obtained in the same manner as in Example 6 except that mixing of the powder particles of Reference Example 1 and Reference Example 2 was changed to mixing of the powder particles of Reference Example 1 and Reference Example 3 (Example 7), mixing of the powder particles of Reference Example 2 and Reference Example 3 (Example 8) and mixing of the powder particles of Reference Example 1, Reference Example 2 and Reference Example 3 (Example 9), all on an equal weight basis.

Comparative Example 2

The powder particles obtained in Reference Example 4 and the powder particles obtained in Reference Example 5 were mixed on an equal weight basis to obtain a powder coating.

Using the powder coating, a coated test piece was prepared in accordance with the above (1). In the coating film formed, blue fine particles and yellow fine particles could be recognized individually, and the coating film had a nonuniform color visually.

Comparative Example 3

The powder particles obtained in Reference Example 6 and the powder particles obtained in Reference Example 7 were mixed on an equal weight basis to obtain a powder coating.

Using the powder coating, it was tried to prepare a coated test piece in accordance with the above (1). However, the powder had poor fluidity and was impossible to apply.

Comparative Example 4

The powder particles obtained in Reference Example 8 and the powder particles obtained in Reference Example 9 were mixed on an equal weight basis to obtain a powder coating.

Using the powder coating, it was tried to prepare a coated test piece in accordance with the above (1). However, the powder had poor fluidity and gave a nonuniform coating film.

TABLE 1

|  | Shape factor (SF) | Volume-average particle diameter (μm) | A | B | C | D | E | F | Softening point (° C.) |
|---|---|---|---|---|---|---|---|---|---|
| Example 1 | 121.3 | 7.5 | 1.4 | 1.6 | 1.4 | 0.6 | 7.4 | 15.3 | 100 |
| Example 2 | 132.5 | 8.7 | 1.6 | 1.8 | 1.5 | 0.9 | 8.3 | 11.7 | 99 |
| Example 3 | 115.4 | 8.4 | 1.5 | 1.6 | 1.4 | 0.5 | 8.5 | 12.3 | 100 |
| Example 4 | 112.6 | 9.2 | 1.6 | 1.7 | 1.5 | 0.7 | 9.2 | 10.4 | 100 |
| Example 5 | 152.0 | 14.1 | 2.1 | 2.1 | 1.7 | 5.6 | 24.3 | 6.3 | 101 |
| Comparative Example 1 | 183.5 | 14.5 | 2.3 | 2.2 | 1.9 | 6.5 | 25.2 | 7.2 | 101 |
| Example 6 | 124.3 | 8.3 | 1.5 | 1.6 | 1.4 | 0.6 | 8.1 | 11.8 | 100 |
| Example 7 | 123.5 | 8.4 | 1.6 | 1.7 | 1.5 | 0.9 | 9.4 | 10.3 | 100 |
| Example 8 | 121.7 | 8.1 | 1.4 | 1.5 | 1.4 | 0.3 | 7.5 | 13.5 | 100 |
| Example 9 | 123.3 | 8.2 | 1.5 | 1.6 | 1.4 | 0.6 | 8.3 | 11.9 | 100 |
| Comparative Example 2 | 113.6 | 18.2 | 1.9 | 2.1 | 1.7 | 8.3 | 35.8 | 2.3 | 100 |
| Comparative Example 3 | 131.2 | 2.6 | 1.4 | 1.5 | 1.5 | 0.0 | 0.0 | 85.7 | 100 |
| Comparative Example 4 | 181.5 | 14.2 | 2.2 | 2.2 | 1.9 | 5.8 | 23.5 | 5.8 | 101 |

A: Dv/Dn
B: Small index ratio
C: Large index ratio
D: Weight percent (%) of particles of 30 μm or above
E: Weight percent (%) of particles of 20 μm or above
F: Number percent (%) of particles of 4 μm or below

TABLE 2

| | Properties of Powder | | | | | Properties of coating film | | | | | |
|---|---|---|---|---|---|---|---|---|---|---|---|
| | Angle of repose | Coatability | | | Luster | Hiding power | Color | | Adhesivity X/100 | Impact resistance | Others |
| | | X | Y | Z | | | Appearance | Comparison | | | |
| Example 1 | 34 | ○ | ○ | ○ | 90 | ○ | White | | 100 | 50 cm | |
| Example 2 | 36 | ○ | ○ | ○ | 88 | ○ | White | | 100 | 50 cm | |
| Example 3 | 31 | ○ | ○ | ○ | 91 | ○ | White | | 100 | 50 cm | |
| Example 4 | 32 | ○ | ○ | ○ | 82 | ○ | White | | 100 | 50 cm | |
| Example 5 | 43 | Δ | Δ | Δ | 63 | Δ | White | | 100 | 50 cm | |
| Comparative Example 1 | 59 | X | X | X | 33 | X | White | | 100 | 50 cm | |
| Example 6 | 31 | ○ | ○ | ○ | 91 | | Green | ○ | 100 | 50 cm | |
| Example 7 | 32 | ○ | ○ | ○ | 92 | | Violet | ○ | 100 | 50 cm | |
| Example 8 | 31 | ○ | ○ | ○ | 91 | | Orange | ○ | 100 | 50 cm | |
| Example 9 | 32 | ○ | ○ | ○ | 92 | | Black | ○ | 100 | 50 cm | |
| Comparative Example 2 | 28 | ○ | ○ | ○ | 32 | | Mottling | X | 100 | 50 cm | |
| Comparative Example 3 | 58 | X | X | X | — | | — | — | — | — | Coating was impossible |
| Comparative Example 4 | 52 | Δ | Δ | Δ | 38 | | Mottling | X | 100 | 50 cm | Uneven film |

Coatability
X: GX-3600S produced by ONODA CEMENT CO., LTD.
Y: EXB56735 produced by Hosokawa Micron K. K.
Z: MPS1-F produced by RANSBURG INDUSTRIE CO., INC.

We claim:

1. A powder coating composition comprising a resin powder comprising a film-forming resin and a crosslinking agent capable fo giving rise to a cross-linking reaction with the resin, wherein the resin powder has a volume-average particle diameter of 3–17 μm and a shape factor (SF) of 100.5–160.

2. A composition according to claim 1, wherein the resin powder has a volume-average particle diameter of 3–12 μm.

3. A composition according to claim 1, wherein the resin powder has a shape factor (SF) of 102.0–150.

4. A composition according to claim 1, wherein the resin powder has a $\overline{Dv}/\overline{Dn}$ ratio of 1–4 as $\overline{Dv}$ is defined as a volume-average particle diameter and $\overline{Dn}$ is defined as a number-average particle diameter.

5. A composition according to claim 4, wherein the $\overline{Dv}/\overline{Dn}$ ratio is 1–3.

6. A composition according to claim 1, wherein the resin powder has a large index ratio of 2 or less.

7. A composition according to claim 1, wherein the resin powder has such particle diameters that the number percent of particles of 4 μm or smaller is 40% or less.

8. A composition according to claim 1, wherein the resin powder has such particle diameters that the weight percent of particles of 30 μm or larger is 30% or less.

9. A composition according to claim 1, wherein the resin powder has a softening point of 50–120° C.

10. A composition according to claim 9, wherein the softening point of the resin powder is 70–110° C.

11. A composition according to claim 1, wherein the film-forming resin is selected from the group consisting of a styrene resin, an acrylic resin, a fluororesin, an epoxy resin and a polyester resin.

12. A composition according to claim 11, wherein the film-forming resin is selected from the group consisting of a styrene resin, an acrylic resin and a fluororesin.

13. A composition according to claim 1, wherein the film-forming resin has a glass transition temperature of 0–100° C.

14. A composition according to claim 1, wherein the film-forming resin has a polar group(s) selected from the group consisting of carboxyl group, sulfone group, phosphoric acid group, formyl group, amino group, amide group, hydroxyl group, cyano group and epoxy group.

15. A composition according to claim 1, wherein the resin powder comprises 1–300 parts by weight of the crosslinking agent per 100 parts by weight of the film-forming resin.

16. A composition according to claim 1, which is a clear powder coating.

17. A composition according to claim 1, wherein the resin powder further comprises a coloring agent.

18. A composition according to claim 17, consisting of a mixture of at least two coloed resin powders each having a different color.

19. An article obtained by applying a powder coating composition set forth in claim 1.

20. A composition according to claim 1, wherein the film-forming resin has a glass transition temperature of 10–80° C.

21. A composition according to claim 1, wherein the resin powder comprises 3–200 parts by weight of the crosslinking agent per 100 parts by weight of the film-forming resin.

* * * * *